(12) United States Patent
Yates

(10) Patent No.: US 12,410,084 B2
(45) Date of Patent: *Sep. 9, 2025

(54) METHODS AND APPARATUS FOR TREATMENT AND PURIFICATION OF WASTEWATER

(71) Applicant: Rio Resources LLC, New Braunfels, TX (US)

(72) Inventor: Dale R. Yates, Spring Branch, TX (US)

(73) Assignee: Rio Resources LLC, New Braunfels, TX (US)

(*) Notice: Subject to any disclaimer, the term of this patent is extended or adjusted under 35 U.S.C. 154(b) by 54 days.

This patent is subject to a terminal disclaimer.

(21) Appl. No.: 18/229,089

(22) Filed: Aug. 1, 2023

(65) Prior Publication Data
US 2024/0034660 A1    Feb. 1, 2024

Related U.S. Application Data

(63) Continuation of application No. 17/315,858, filed on May 10, 2021, now Pat. No. 11,739,017, which is a
(Continued)

(51) Int. Cl.
*B01D 17/02*    (2006.01)
*B01D 21/02*    (2006.01)
(Continued)

(52) U.S. Cl.
CPC ............ *C02F 9/00* (2013.01); *B01D 17/0205* (2013.01); *B01D 17/0208* (2013.01);
(Continued)

(58) Field of Classification Search
CPC ................ B01D 17/0208; B01D 21/10; B01D 17/0205; B01D 21/2444; B01D 21/245; C02F 1/24; C02F 1/40
(Continued)

(56) References Cited

U.S. PATENT DOCUMENTS

3,510,006 A    5/1970    Cheysson
3,666,108 A    5/1972    in 't Veld
(Continued)

FOREIGN PATENT DOCUMENTS

CN    204474406 U    7/2015
EP    0 823 887 B1    3/2002
(Continued)

OTHER PUBLICATIONS

Ahmadun, Fakhru'l-Razi, Pendashteh, Alireza, Abdullah, Luqman Chuah, Biak, Dayang Radiah Awang Madaeni, Sayed Siavash, & Abidin, Zurina Zainal (2009). Review of technologies for oil and gas produced water treatment. Journal of Hazardous Materials, 170, 530-551 (22 pages).

(Continued)

*Primary Examiner* — Claire A Norris
(74) *Attorney, Agent, or Firm* — Pizarro Allen PC

(57) ABSTRACT

A method of treating oil and gas produced water may include: receiving produced water from one or more wells; separating an aqueous portion of the produced water from oil and solids included in the produced water in order to provide recovered water; performing anaerobic bio-digestion of organic matter included in the produced water using a biomass mixture of anaerobic bacteria obtained from a plurality of wells; aerating the recovered water in order to promote metal precipitation; and performing aerobic bio-digestion of organic matter present in the recovered water. Some embodiments may also include one or more of anoxic equalization, filtration, pasteurization, reverse osmosis, and biocide treatment of the recovered water. The recovered water may be used for oil and gas well fracking and/or land and stream application. Other methods of treating oil and gas produced water are also described.

8 Claims, 8 Drawing Sheets

Related U.S. Application Data continuation of application No. 16/789,142, filed on Feb. 12, 2020, now Pat. No. 11,001,518.

(51) Int. Cl.

| | | |
|---|---|---|
| *B01D 21/24* | (2006.01) | |
| *C02F 1/02* | (2023.01) | |
| *C02F 1/24* | (2023.01) | |
| *C02F 1/40* | (2023.01) | |
| *C02F 1/44* | (2023.01) | |
| *C02F 1/50* | (2023.01) | |
| *C02F 1/52* | (2023.01) | |
| *C02F 3/12* | (2023.01) | |
| *C02F 3/28* | (2023.01) | |
| *C02F 9/00* | (2023.01) | |
| C02F 101/20 | (2006.01) | |
| C02F 101/30 | (2006.01) | |
| C02F 103/10 | (2006.01) | |

(52) U.S. Cl.
CPC ......... *B01D 21/10* (2013.01); *B01D 21/2444* (2013.01); *B01D 21/245* (2013.01); *B01D 21/2494* (2013.01); *C02F 1/24* (2013.01); *C02F 1/40* (2013.01); *C02F 1/02* (2013.01); *C02F 1/441* (2013.01); *C02F 1/442* (2013.01); *C02F 1/444* (2013.01); *C02F 1/50* (2013.01); *C02F 1/5236* (2013.01); *C02F 3/1268* (2013.01); *C02F 3/28* (2013.01); *C02F 2101/20* (2013.01); *C02F 2101/30* (2013.01); *C02F 2103/10* (2013.01); *C02F 2301/106* (2013.01); *C02F 2303/04* (2013.01)

(58) Field of Classification Search
USPC .................................................. 210/605, 767
See application file for complete search history.

(56) References Cited

U.S. PATENT DOCUMENTS

| | | | |
|---|---|---|---|
| 3,849,310 A | 11/1974 | Condolios et al. | |
| 4,073,722 A | 2/1978 | Grutsch et al. | |
| 4,482,459 A | 11/1984 | Shiver | |
| 4,783,272 A | 11/1988 | Patterson | |
| 5,132,025 A | 7/1992 | Hays | |
| 5,232,596 A | 8/1993 | Castaldi | |
| 5,316,664 A | 5/1994 | Gregoli | |
| 5,908,040 A | 6/1999 | Defraites, Jr. | |
| 6,113,786 A | 9/2000 | Burke | |
| 7,527,736 B2 | 5/2009 | Shafer et al. | |
| 8,105,488 B2 | 1/2012 | Shafer et al. | |
| 8,529,763 B2 | 9/2013 | Shafer et al. | |
| 8,790,514 B2 | 7/2014 | Shafer et al. | |
| 8,877,690 B2 | 11/2014 | Keister | |
| 9,284,206 B2 | 3/2016 | Presutti | |
| 10,724,314 B1 * | 7/2020 | Yates ................... | E21B 21/065 |
| 11,001,518 B1 | 5/2021 | Yates | |
| 11,739,017 B2 * | 8/2023 | Yates ................ | B01D 17/0205 |
| | | | 210/605 |
| 2003/0047499 A1 | 3/2003 | Levitin | |
| 2004/0031750 A1 | 2/2004 | Larsson | |
| 2005/0040107 A1 | 2/2005 | Kasparian et al. | |
| 2005/0218074 A1 | 10/2005 | Pollock | |
| 2005/0274669 A1 | 12/2005 | Marchesseault et al. | |
| 2007/0102359 A1 | 5/2007 | Lombardi et al. | |
| 2008/0156709 A1 | 7/2008 | Johnson | |
| 2008/0237141 A1 | 10/2008 | Kerfoot | |
| 2009/0014392 A1 | 1/2009 | McEwen | |
| 2009/0032446 A1 | 2/2009 | Wiemers et al. | |
| 2009/0183922 A1 | 7/2009 | Smith et al. | |
| 2010/0038310 A1 | 2/2010 | Shafer et al. | |
| 2010/0216217 A1 | 8/2010 | Hendrickson et al. | |
| 2011/0186510 A1 | 8/2011 | Whiteman | |
| 2011/0272362 A1 | 11/2011 | Sikes et al. | |
| 2013/0048562 A1 | 2/2013 | Keister | |
| 2013/0126426 A1 | 5/2013 | Jones et al. | |
| 2013/0203144 A1 | 8/2013 | Josse | |
| 2013/0330128 A1 | 12/2013 | Shafer et al. | |
| 2013/0341269 A1 | 12/2013 | Bouchet | |
| 2014/0021033 A1 | 1/2014 | Frick | |
| 2014/0116967 A1 | 5/2014 | Smith et al. | |
| 2014/0124453 A1 | 5/2014 | Presutti | |
| 2015/0001149 A1 | 1/2015 | Kuehnle et al. | |
| 2016/0045841 A1 | 2/2016 | Kaplan et al. | |
| 2019/0210891 A1 | 7/2019 | Antonneau | |

FOREIGN PATENT DOCUMENTS

| | | |
|---|---|---|
| GB | 2 413 124 A | 10/2005 |
| RU | 2692728 C2 | 6/2019 |
| SU | 1031914 A1 | 7/1983 |
| SU | 1481211 A1 | 5/1989 |
| WO | 1997/023264 A1 | 7/1997 |
| WO | 2019/221609 A1 | 11/2019 |

OTHER PUBLICATIONS

Liu, Ying, Wang, Jianyou, & Wang, Lidan (2019). An energy-saving "nanofiltration/electrodialysis with polarity reversal (NF/EDR)" integrated membrane process for seawater desalination. Part III. Desalination, 452, 230-237 (8 pages).

Monnot, Mathias, Laborie, Stephanie, Cabassud, Corinne (2016). Granular activated carbon filtration plus ultrafiltration as a pretreatment to seawater desalination lines: Impact on water quality UF fouling. Desalination 383, 1-11 (11 pages).

Melo, Marcel, Schluter, Helga, Ferreira, Jailton, Magda, Rosana, Júnior, Agenor, & Aquino, Oswaldo de (2010). Advanced performance evaluation of a reverse osmosis treatment for oilfield produced water aiming reuse. Desalination, 250, 1016-1018 (3 pages).

Neff, Jerry M., Lee, Kenneth, & DeBlois, Elisabeth M. (2011). Produced Water: Overview of Composition, Fates and Effects (61 pages).

Pendashteh, Ali Reza, Abdullah, Luqman Chuah, Fakhru'l-Razi, A., Madaeni, Sayed Siavash, Abidin, Zurina Zainal, Biak, Dayang Radiah Awang (2012). Evaluation of membrane bioreactor for hypersaline oily wastewater treatment. Process Safety and Environmental Protection, 90, 45-55 (11 pages).

Turkiewicz, Anna, Brzeszcz, Joanna, Kapusta, Piotr (2013). The application of biocides in the oil and gas industry. NAFTA-GAZ Monthly Journal of the Oil and Gas Institute, Publication No. 69, 103-111 (9 pages).

United States Environmental Protection Agency. National Recommended Water Quality Criteria—Aquatic Life Criteria Table (https://www.epa.gov/wqc/national-recommended-water-quality-criteria-aquatic-life-criteria-table#/main-content) (8 pages).

Zhang, Min, Wang, Junming, Zhang, Zhongzhi, Song, Zhaozheng, Zhang, Zhenjia, Zhang, Beiyu, Zhang, Guangqing, Wu, Wei-Min (2016). A field pilot-scale study of biological treatment of heavy oil-produced water by biological filter with airlift aeration and hydrolytic acidification system. Environ Sci Pollut Res, 23, 4919-4930 (13 pages).

Osamor et al., "Oil/Water Separation: State-Of-The-Art", E.P.A., published 1978 (6 pages).

Kumar, et al., "A review of permissible limits of drinking water", Indian J. Occup. Environ. Med., Jan.-Apr. 2012, 16(1), pp. 40-44 (11 pages).

* cited by examiner

D' CLAIRE OIL WATER SEPARATOR
SCALE: 1" = 5'

METHODS AND APPARATUS FOR TREATMENT AND PURIFICATION OF WASTEWATER

CROSS REFERENCE TO RELATED APPLICATIONS

This application is a continuation of U.S. patent application Ser. No. 17/315,858 filed May 10, 2021, which is a continuation of U.S. patent application Ser. No. 16/789,142 filed Feb. 12, 2020, the disclosure of each of which is incorporated herein by reference.

FIELD

This application relates generally to the field of processing oilfield produced water transforming the produced water by methods of purification that yields a final product suitable for land or stream application.

BACKGROUND

There is an increasing problem with scarcity of available water around the world with only about 3% of total water being freshwater. The world's population is estimated at 7.5 billion with demand for freshwater sources growing rapidly. Water scarcity is recognized as one of the greatest problems and challenges of the 21st Century making water reuse a necessity. The oil and gas industry in managing oil and gas production both onshore and offshore have access to an untapped source of potential useable water, known as produced water, that is considered a hazardous waste product by industry and requiring costly disposal. Produced water includes formation water which may include seawater or freshwater that has been trapped in geological reservoirs with oil and natural gas. Globally, the produced water to oil ratio is about 3:1 with global estimates of approximately 250 million barrels/day. As wells mature, this ratio generally increases.

Chemical constituents and characteristics of produced water can vary significantly from location to location and region to region. Although primary constituents may vary in quantity, they remain a mixture of organic and inorganic compounds with insoluble formation solids. Minerals and heavy metals along with dissolved gasses and dispersed hydrocarbons are also present, along with the potential for naturally occurring radioactive materials (NORM), thus increasing the challenges for development of an effective treatment process.

Due to demands for freshwater and increasing production activity, there is a serious need for treatment methods that are flexible and cost effective to collect, treat, and recycle produced water for both stream and land application to meet irrigation needs and restoration of underground freshwater supplies. Multiple approaches have been employed to try and achieve repurposing of produced water; however, these approaches have proven to be deficient for a number of reasons, including an inability to handle large treatment volumes and high operational costs.

Methods currently employed to treat produced water have generally been limited for repurposing to meet a fracking water standard that is high in total dissolved solids consisting primarily of salt and commonly referred to as brackish or brine water. Melo et al. (Melo et al. 2010, Desalination, 250, 1016-1018) published a treatment method that evaluated incorporation of reverse osmosis and nano-filtration to produce a potentially beneficial product. The disclosed method included multiple pre-treatment steps and incorporated an oil/water separator, water softener, sand filters, ion exchange softener and cartridge filtration. One concern that the authors had with the process was that hazardous materials might still be present. No further reports on this treatment method have been identified.

Additional methods for purifying produced water have been employed such as evaporation/condensation and distillation, but large volume processing and time of processing remain serious issues for these types of approaches. Membrane anaerobic bioreactor approaches have had some laboratory success. For example, Pendashteh (Pendashteh et al. 2012. Process Safety and Environmental Protection, 90, 45-55) reported the necessary reaction time for processing to be at least 12 hours, with 48 hours being optimal under their laboratory experimental design. Low throughput and reactor time necessary thus far have defeated field application of that approach.

There is a need for improved methods for treating produced water from oil field operation so that processed produced water may be transformed for useful purposes.

SUMMARY

In some embodiments, a method of treating oil and gas produced water may include: receiving produced water from one or more wells; separating an aqueous portion of the produced water from oil and solids included in the produced water in order to provide recovered water; performing anaerobic bio-digestion of organic matter included in the recovered water using a biomass mixture of anaerobic bacteria obtained from a plurality of wells; aerating the recovered water in order to promote metal precipitation; and performing aerobic bio-digestion of organic matter present in the recovered water.

In some embodiments, a method of treating oil and gas produced water may also include transitioning the aeration and aerobic treated water to anoxic equalization allowing for completion of oxidation and further bio-digestion of organic matter providing a treated recovered water product.

In some embodiments, a method of treating oil and gas produced water may include receiving produced water from one or more wells; separating an aqueous portion of the produced water from oil and solids included in the produced water in order to provide recovered water; performing anaerobic bio-digestion of organic matter included in the recovered water using a naturally obtained biomass mixture of anaerobic bacteria obtained from a plurality of wells; aerating the recovered water in order to promote metal precipitation; performing aerobic bio-digestion of organic matter present in the recovered water; filtering insoluble particles from the recovered water using size filtration; further filtering ionic substances from the recovered water using ion capture filtration; and micro-filtering the recovered water using a nominal micro-filter having a filter size equal to or less than one micron or an ultra-or nano-filter; thereby providing a product suitable for oil and gas well fracking or for further processing to meet stream and land application standards.

In some embodiments, a method of treating oil and gas produced water may include providing a first biomass mixture within a bio-digester, the first biomass mixture including biomass stored within the bio-digester following one or more previous treatments of produced water; receiving a new batch of produced water from one or more oil or gas wells; and bio-digesting organic matter included in the new batch of produced water using the first biomass mixture.

In some embodiments, a method of treating oil and gas produced water may include processing the treated recovered water product by size and ion capture filtration and decontamination/pasteurization yielding a filtered essentially microbial free water product.

In some embodiments, a method of treating oil and gas produced water may include treating the filtered essentially microbial free water product by further filtration and/or ion capture producing a product suitable for reverse osmosis treatment.

In some embodiments, a method of treating oil and gas produced water may also include treating the recovered water by reverse osmosis treatment.

DETAILED DESCRIPTION

The following terms as used herein should be understood to have the indicated meanings.

When an item is introduced by "a" or "an," it should be understood to mean one or more of that item.

"Biomass" means living matter including bacteria. Biomass may take various forms, such as a suspension of bacteria in a liquid, bacteria attached to a structure such as a biofilm, and a combination thereof.

"Comprises" means includes but is not limited to.
"Comprising" means including but not limited to.
"Having" means including but not limited to.
"Size filtration" means filtration of insoluble solids based on particle size.

The present disclosure relates to systems, methods, and compositions useful for the treatment of oil and gas produced water that yields products suitable for land or stream applications or other uses. Produced water includes formation water that has been trapped in a geological reservoir with oil and natural gas and collected during oil well processing. The produced water may generally be considered a waste product of production if not further processed for a usable purpose.

Produced water composition can vary greatly based on the associated well or formation. Accordingly, methods for treating produced water may advantageously be configured for accepting a range of various compositional matrices while maintaining effectiveness to yield an end product suitable for its intended purpose.

In some embodiments, methods herein include treatment of produced water that combines anaerobic bio-digestion of produced water with separation of oil, water, and insoluble solids therefrom in order to provide an anaerobically treated water product.

In some embodiments, methods herein may further include processing the anaerobically treated water product by aeration, and aerobic bio-digestion followed by equalization, yielding a treated recovered water product.

In some embodiments, methods herein may further include processing the treated recovered water product by either or both of insoluble solids and ion capture filtration and decontamination/pasteurization processing to provide a filtered substantially microbial free recovered water product suitable for further freshwater processing or oil and gas well fracking water use.

In some embodiments, methods herein may further include processing the filtered substantially microbial free recovered water product by further filtration and/or ion capture producing a product suitable for reverse osmosis (RO) treatment.

In some embodiments, the ordering of the aforementioned process steps can be changed to facilitate variability in oil and gas received produced water to meet one or more sets of desired specifications.

Figure 1:
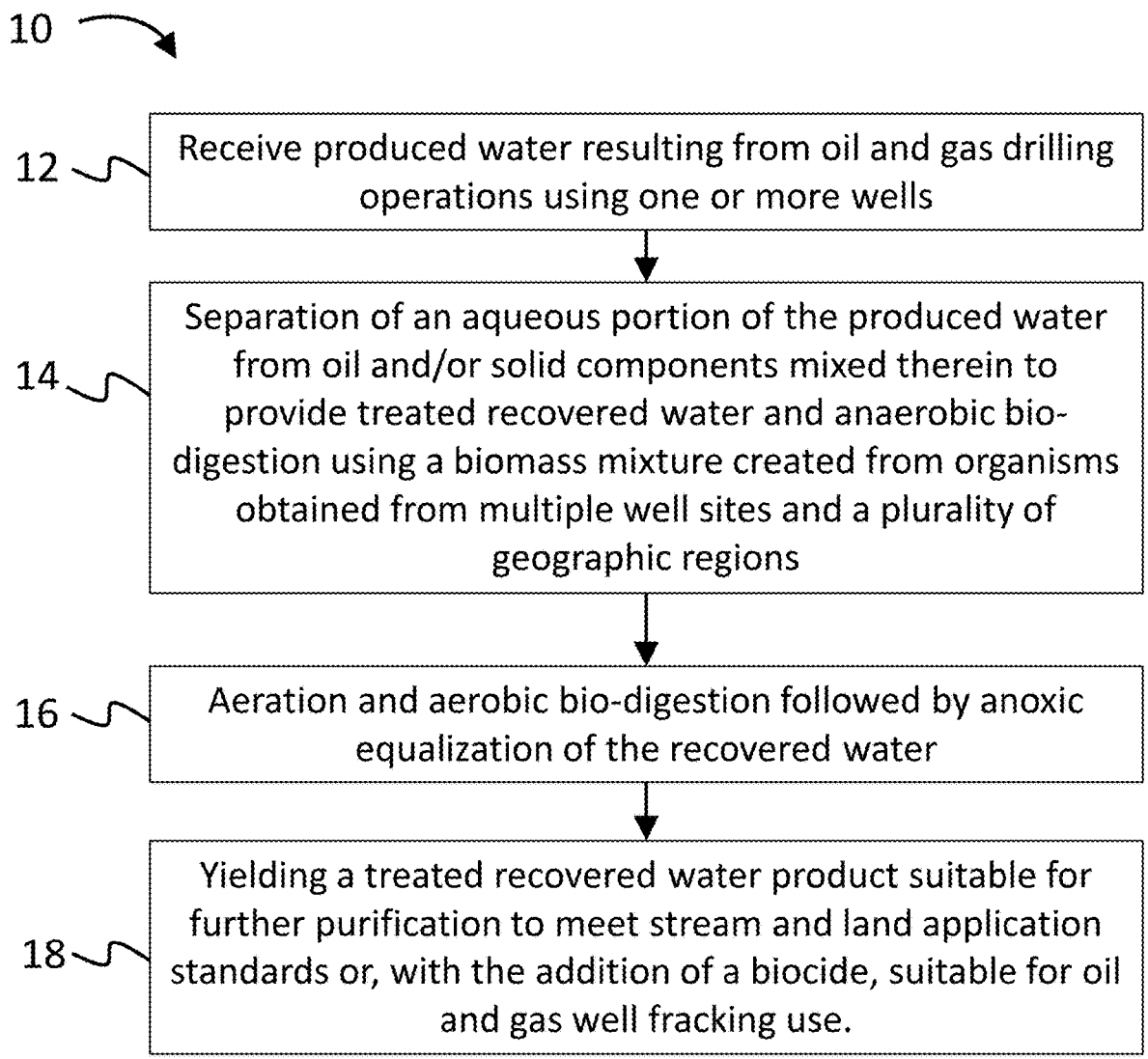
FIG. 1 is a flowchart of a method for treating oil and gas produced water resulting from oil and gas drilling operations in order to provide treated recovered water yielding a product suitable for oil and gas well fracking use with addition of a biocide.

Referring to FIG. 1, in some embodiments, a method 10 may include receiving produced water from one or more oil and gas wells as shown at 12. As shown at 14, the method may include processing oil and gas produced water by separating oil, water and solids and simultaneously or sequentially beginning anaerobic bio-digestion of organic matter that exists as contaminants in the water. Anaerobic bio-digestion may be accomplished using a selected biomass created by mixing organisms obtained from a plurality of well sites and from various formations from the Permian Region of the Southwestern United States that creates a biomass capable of handling diverse compositions of produced water. For example, in some embodiments, the anaerobic biomass may include a plurality of organisms that fall into the following Taxonomic Classes: Bacteroidia, Clostridia, Deltaproteobacter, Epsilonproteobacteria, Gammaproteobacteria, Negativicutes, and Synergistia, which may be obtained from raw materials from multiple well sites and multiple formations from the Permian Region of the Southwestern United States over an extended period of time of about two to three years.

In some embodiments, anaerobic bio-digestion may occur for about 4 to about 24 hours at a pH greater than about 5.5 and a temperature greater than about 27° C. In some embodiments, the preferred time for bio-digestion may range from about 5-9 hours. Of course, other suitable pH, temperature, residence times, organisms, formations, and collection times may be used, depending on the particular mixture involved.

In some embodiments, a temperature greater than about 55° C. may be utilized to achieve thermophilic anaerobic bio-digestion maintaining a pH greater than about 5.5 for some or all of the duration of the bio-digestion process.

In some embodiments, a combination of different types of oil/water/solids separators may be employed in combination with different types of bioreactors, such as a membrane bioreactor that may be utilized for anaerobic bio-digestion. A membrane bioreactor may also serve as a filtration device for insoluble solids removal. In some embodiments, anaerobic biomass separation may be incorporated prior to further processing.

In some embodiments, as shown at 16, separation of oil/water/solids and anaerobic bio-digestion may be followed by aeration and anoxic equalization of the separated and anaerobic treated recovered water product for substantial separation of minerals and metals and aerobic bio-digestion for further organic bio-digestion. In some embodiments, aeration may either be by use of diffused air or aspirated air that achieves a dissolved oxygen level of about 2-8 mg/L or about 4-7 mg/L and a residence time of about 30 minutes to about 24 hours. In some embodiments, the residence time for aeration may range from about 1-12 hours or about 2-4 hours. In some embodiments, aerobic bio-digestion may be accomplished using a biomass created by mixing organisms obtained from a plurality of well sites from various formations from the Permian Region of the Southwestern United States, such as a plurality of wells from one or more of the Midland Basin, Western Delaware Basin, Central Basin, and Marfa Basin, for example. In some embodiments, the aerobic biomass may include a plurality of organisms that fall into the following Taxonomic Classes: Actinobacteria, Alphaproteobacteria, Bacteroidia, Betaproteobacteria, and Gammaproteobacteria, which may be obtained from raw materials from multiple well sites and multiple formations from the Permian Region of the Southwestern United States over an extended period of time of about two to three years. In some embodiments, recovered water may be transitioned from aeration and aerobic bio-digestion to anoxic equalization allowing for completion of oxidation and further bio-digestion of organics for a residence time of about 30 minutes to about 12 hours or about 2-4 hours. Of course, other suitable oxygen levels, residence times, organisms, formations, and collection times may be used, depending on the particular mixture involved.

In some embodiments, a membrane bioreactor may be utilized for aerobic bio-digestion. In some embodiments, aerobic biomass separation may be incorporated prior to further processing. The processes of oil, water, solids separation, anaerobic bio-digestion, aeration, aerobic bio-digestion and anoxic equalization may yield a treated recovered water product suitable for further downstream processing that will meet stream and land application standards.

In some embodiments, see, e.g., FIG. 1, Step 18, a suitable biocide such as a non-oxidizing antibacterial/antifungal or an oxidizing antibacterial/antifungal may be added to the treated recovered water product for use in oil and gas well fracking operations.

Figure 2:
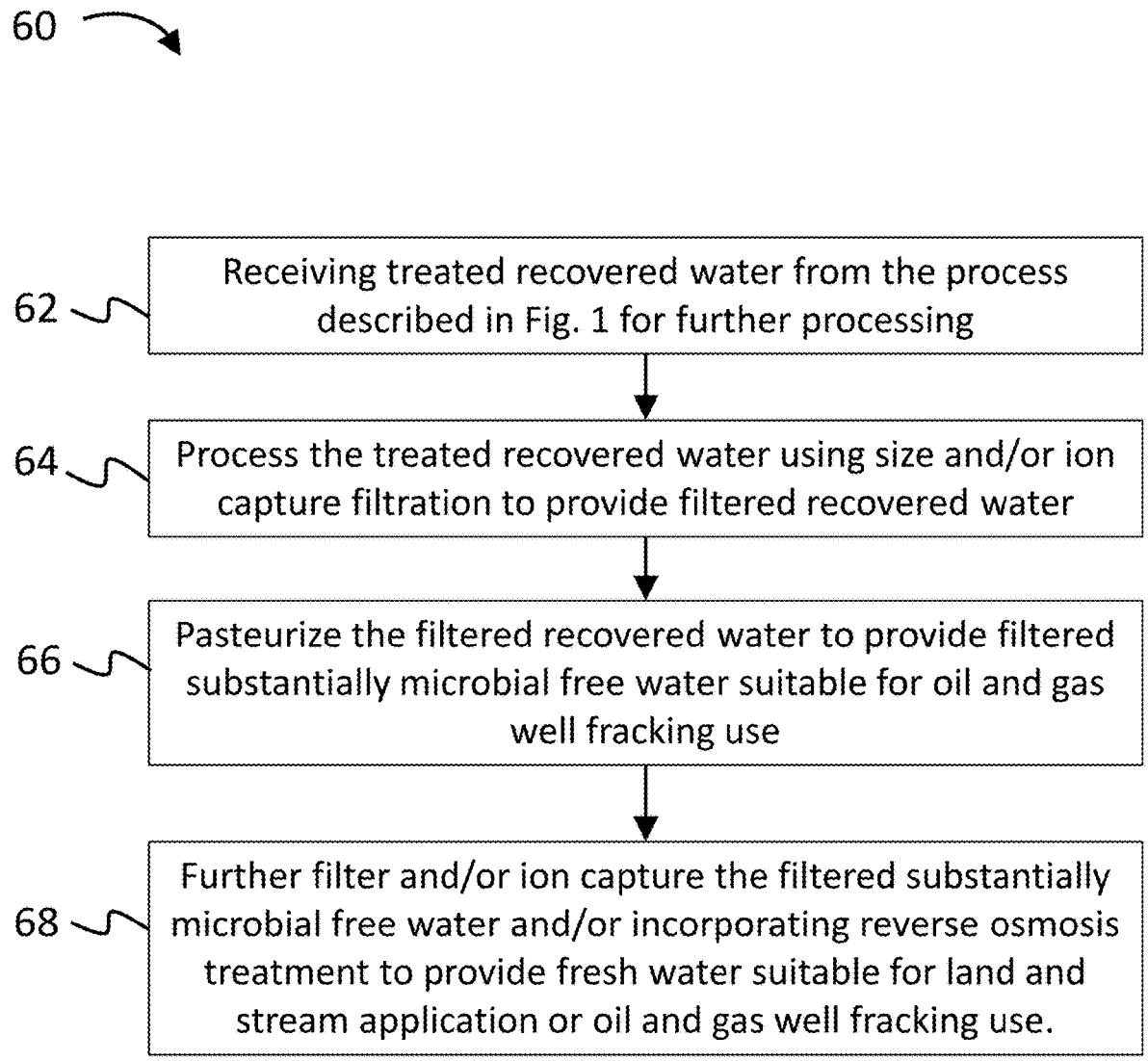
FIG. 2 is a flowchart of a method for treating the treated recovered water to yield fresh water suitable for land and stream application or oil and gas well fracking use.

Referring to FIG. 2, a method 60 of processing produced water may include receiving treated recovered water from the process described in FIG. 1 for further processing as indicated at 62. In some embodiments, see, e.g., FIG. 2, Step 64, a first filtration of treated recovered water may use a filter removing insoluble particles ranging in size from about 1-75 microns, for example, or about 1-20 microns, or about 1-10 microns. Of course, other suitable filter sizes may be used. In some embodiments, the physical separation can be achieved by use of a membrane or media type filter. In some embodiments, see, e.g., FIG. 2, step 64, ion capture may be incorporated as part of filtration for further removal of cationic and certain anionic substances, such as sodium and chlorides, for example. In some embodiments, a dedicated ion capture of anionic materials can be incorporated during the filtration process. For example, anionic charged glass media of different particle sizes can be used for capture of cationic materials. To achieve maximum capture, anionic glass charged media of about 0.25 mm particle size may be used and may include about 60-90% of media incorporated into a filter housing.

In some embodiments, see, e.g., FIG. 2, Step 66, filtered recovered water may be transitioned to a pasteurizer that achieves a temperature of about 71° C. to about 94° C., for example, and further cooled to a temperature less than about 35° C. yielding a filtered substantially microbial free water product for freshwater processing or for oil and gas fracking water use. In some embodiments, a nominal micro-filter of equal to or less than 0.45 microns, for example, and/or an ultra-or nano-filter can be used to replace the pasteurizer to yield the filtered substantially microbial free water product suitable for oil and gas well fracking use.

In some embodiments, see, e.g., FIG. 2, Step 68, filtered substantially microbial free water may be further filtered producing a product suitable for reverse osmosis (RO) treatment. In some embodiments, filtration can be accomplished by using ion capture and/or using micro-filtration, ultra-filtration and/or nano-filtration. Filtration may remove insoluble particles ranging in size greater than 5 microns, for example, and in some embodiments may remove insoluble particles greater than 1 micron. In some embodiments, an ultra-filter or nano-filter can be used achieving filtration of 0.05 microns or 100,000 Daltons or below. In some embodiments, pre-reverse osmosis filtered water is transitioned to RO treatment. Select saltwater membranes may be utilized for RO treatment that will handle dissolved solids content levels as great as 50,000 ppm, for example.

In some embodiments, ordering of process steps in the methods 10, 60 may be changed to accommodate variability in oil and gas received produced water. For example, where produced water contains heavy metals that are deleterious to bio-digestion of organic compounds, the heavy metals may be removed by first separation of oil/water and solids and then separation of metals by controlled oxidation to enhance metal precipitation using aeration. In some embodiments, ion capture separation inclusive of electrodialysis or ion exchange resins prior to anaerobic bio-digestion may also be utilized.

In some embodiments herein, bio-digestion may involve mixing produced water, which may itself include microorganisms, with a selected biomass mixture of microorganisms collected over time from a plurality of different oil and/or gas wells. In some embodiments, the plurality of wells may be found in different areas of a particular oil and/or gas producing geographic region and/or basins. Still in other embodiments, the plurality of wells may be based on one or more characteristics of either or both of a type of geologic formation into which wells may be drilled, characteristics of produced water derived therefrom, or both. For example, geologic formations and produced water may be characterized based on levels of pH, levels of salinity, levels of heavy metals, in situ well or formation temperature, or other parameters and any combinations thereof. The plurality of wells may then be selected so that collected biomass is naturally designed to operate over a selected range of any of the aforementioned well or produced water characteristics or combinations thereof. A geographic region as used herein may refer to an extended area of land or sea known to include oil or gas based on common geologic history. For example, a geographic region may contain several basins and/or formations known to be oil or gas rich or part of an oil or gas rich basin or formation.

In some embodiments, at least a portion of the stored biomass mixture may be transferred from a biodigester to one or more separate biodigesters to seed other digesters for expansion of produced water bio-digestion.

The systems and methods herein may further be understood in terms of the following Examples.

EXAMPLE 1

Figure 3:
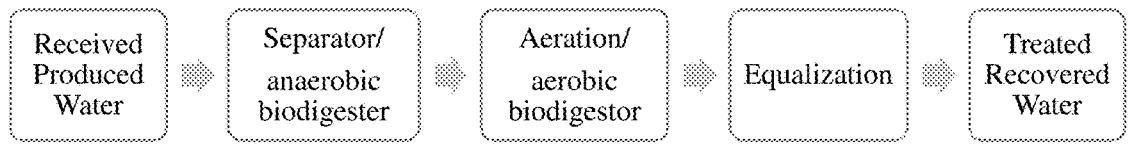
FIG. 3 is a flowchart of a method for processing produced water in order to provide treated recovered water.

FIG. 3 shows a schematic representation of the process flow used in this Example 1. Produced water was received and was processed through a combination oil/water/solids separator and biodigester in a single unit as described in U.S. patent application Ser. No. 16/109,563 filed Aug. 22, 2018, which is commonly owned by Applicant and incorporated herein by reference. The apparatus efficiently separates oil and solids from the produced water and allows anaerobic bio-digestion to occur within the separator thereby reducing organic contaminants present in the water. Bio-digestion was accomplished with a mixture of anaerobic bacteria. The anaerobic biomass included a plurality of organisms that fall into the following Taxonomic Classes: Bacteroidia, Clostridia, Deltaproteobacter, Epsilonproteobacteria, Gammaproteobacteria, Negativicutes, and Synergistia obtained from raw materials from multiple well sites, and multiple formations from the Permian Region of the Southwestern United States over an extended period of time of about two to three years. The biomass was maintained in the biodigester and continual modification was accomplished by addition of received oil and gas waste products raw materials from the aforementioned multiple sites and formations allowing for a symbiotic ecosystem to occur. Following separation and anaerobic treatment, the recovered separated processed water proceeded to an aeration vessel with diffused aeration for two hours oxidizing metals and minerals in the water. Diffused aeration also allowed for further aerobic bio-digestion to occur. The aerobic biomass included a plurality of organisms that fall into the following Taxonomic Classes: Actinobacteria, Alphaproteobacteria, Bacteroidia, Betaproteobacteria, and Gammaproteobacteria obtained from raw materials from multiple well sites, and multiple formations from the Permian Region of the Southwestern United States over an extended period of time of about two to three years. Once aerated, the water was allowed to equalize in a vessel for two additional hours where upon leaving, treated recovered water was achieved.

Data in Table 1 are certified commercial lab results for the received produced water and treated recovered water following treatment. A 97.6% decrease in total suspended solids was observed and over 70% reduction in all metals and minerals was determined. Reductions of 86.1% and 83.5% were recorded for chloride and arsenic, respectively. These reductions are indicative that a substantial amount of biological bio-digestion was occurring throughout treatment. The aeration and equalization processes additionally removed large amounts of metal and mineral contaminants.

TABLE 1

| Parameter | Received Produced Water | Treated Recovered Water | Percent Change |
|---|---|---|---|
| Arsenic (mg/L) | 0.11 | 0.0182 | 83.5 |
| Barium (mg/L) | 4.41 | 0.451 | 89.8 |
| Cadmium (mg/L) | <0.004 | <0.002 | — |

TABLE 1-continued

| Parameter | Received Produced Water | Treated Recovered Water | Percent Change |
|---|---|---|---|
| Calcium (mg/L) | 2850 | 387 | 86.4 |
| Chromium (mg/L) | 0.00896 | <0.004 | — |
| Lead (mg/L) | <0.02 | <0.01 | — |
| Magnesium (mg/L) | 434 | 98.4 | 77.3 |
| Potassium (mg/L) | 557 | 87.8 | 84.2 |
| Sodium (mg/L) | 46800 | 6310 | 86.5 |
| Selenium (mg/L) | 0.633 | 0.0173 | 97.2 |
| Silver (mg/L) | <0.004 | <0.002 | — |
| Chloride (mg/L) | 76400 | 10600 | 86.1 |
| Fluoride (mg/L) | 47.5 | <10.0 | — |
| Sulfate | 305 | 571 | 87.2 increase |
| Mercury (mg/L) | <0.001 | <0.0002 | — |
| Nitrate as N (mg/L) | <2.00 | <2.00 | — |
| Nitrite as N (mg/L) | <2.00 | <2.00 | — |
| Toluene | 1.26 | 0.554 | 56.0 |
| Total Suspended Solids (mg/L) | 2490 | 60.5 | 97.6 |
| Biological Oxygen Demand (BOD) (mg/L) | 467 | 15.2 | 96.7 |
| Hydrogen Sulfide (mg/L) | <5.00 | <5.00 | — |
| Specific Conductance (umhos/cm) | 174000 | 32000 | 81.6 |

The resulting product from the separation, bio-digestion, aeration and equalization processes described provide a suitable product for further processing to achieve objectives for a usable oil and gas well fracking product or freshwater product for land irrigation or stream application. In some embodiments, with the addition of an appropriate biocide to the treated recovered water product, it could in certain circumstances be used in oil and gas well fracking.

EXAMPLE 2

Treated recovered water achieved through the processing described in Example 1 was further treated by microfiltration. A 20-micron filtration followed by 5-micron filtration was used to achieve the results in Table 2.

TABLE 2

| Parameter | Filtered Water (mg/L) |
|---|---|
| Arsenic (mg/L) | nd |
| Barium (mg/L) | 0.444 |
| Cadmium (mg/L) | nd |
| Calcium (mg/L) | 589 |
| Chromium (mg/L) | nd |
| Iron (mg/L) | — |
| Lead (mg/L) | nd |
| Magnesium (mg/L) | 120 |
| Manganese (mg/L) | — |
| Potassium (mg/L) | 97.1 |
| Sodium (mg/L) | 6960 |
| Selenium (mg/L) | nd |
| Silver (mg/L) | nd |
| Chloride (mg/L) | 11000 |
| Fluoride (mg/L) | 5.76 |
| Sulfate | 766 |
| Mercury (mg/L) | nd |
| Nitrate as N (mg/L) | nd |
| Nitrite as N (mg/L) | nd |
| Total Suspended Solids (mg/L) | 10.8 |
| pH | 7.88 |
| Total Alkalinity | 111 |
| Cation-Anion Balance (%) | 2.4 |

The resulting product obtained following the described filtration would be suitable for use in oil and gas well fracking operations with an incorporated addition of a biocide.

EXAMPLE 3

Figure 4:
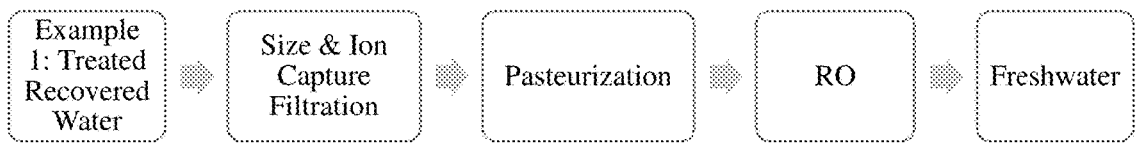
FIG. 4 is a flowchart of a method for processing and purification of treated recovered water to produce freshwater.

FIG. 4 is a schematic diagram of the process flow for this Example 3. Treated recovered water obtained from the process demonstrated in Example 1 was further processed by using a combination AFM™ ion capture filtration media manufactured by Dryden Aqua Ltd (Edinburgh, United Kingdom) capable of removal of insoluble particles greater than 1 micron and capture of cationic ions (see British Patent Application Publication No. GB2413124A, which is incorporated herein by reference). A combination of media size of about 2-6 mm, about 0.4-1 mm, and about 0.25-0.5 mm was used at 17.5%, 17.5%, and 65%, respectively, by volume. Total dissolved solids and total suspended solids were reduced as a result of filtration as shown in the Post Filtration data column of Table 3 below. A reduction of 82.8% and 84.8% were achieved for chloride and sodium, respectively, by use of the aforementioned ion capture filtration media. A significant reduction in calcium (63.6%), magnesium (71.3%) and potassium (72%) were observed as well as an 83.7% reduction in sulfates, yielding a product suitable for reverse osmosis treatment. Following filtration, the water was further treated using pasteurization at 170° C. for bio-decontamination followed by use of a reverse osmosis (RO) system for further removal of impurities.

Water quality data for the post RO treated water in Example 3 is shown in Table 3. A 16.2 mg/L chloride level and 14.4 mg/L sodium level was achieved as well as reduction of several parameters such as Bromide, Magnesium, Sulfate, Nitrite, Total Petroleum Hydrocarbons, and Alkalinity falling below detection limits of the assays used.

The results indicated that all finished RO water parameters were well below stream water standards established by the United States Environmental Protection Agency (EPA) (see National Recommended Water Quality Criteria-Aquatic Life Criteria Table available at https://www.epa.gov/wqc/national-recommended-water-quality-criteria-aquatic-life-criteria-table, which is attached hereto as an Appendix and incorporated herein by reference) (referred to herein as the "EPA Freshwater Standards"). A significant reduction in sodium, calcium, magnesium and potassium (cations) as well as chlorides and sulfates (anions) post ion capture filtration was demonstrated as compared to values shown in Table 1, Treated Recovered Water. The method of treatment demonstrated the capability of providing freshwater suitable for land application or irrigation, helping restore diminishing levels of ground water. Freshwater generated by the treatment process described herein would additionally provide water suitable for release to reservoirs, streams and rivers for potential further processing to meet standards for potable water. The freshwater generated could also be used for oil and gas well fracking if so desired.

EXAMPLE 4

Figure 5:
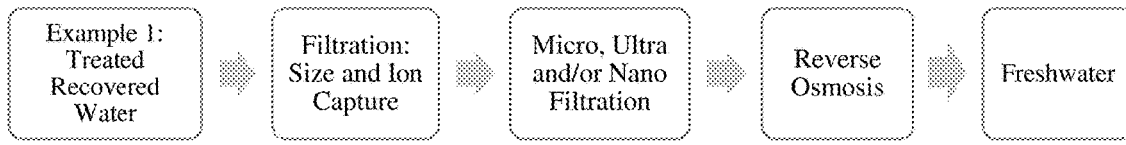
FIG. 5 is a flowchart of another method for processing treated recovered water to produce freshwater.

Treated recovered water obtained from processing described in Example 1 can be further processed to meet land and stream application standards by micro-filtration, ultra-filtration and/or nano-filtration for removal of bacteria and dissolved solids prior to RO finishing. The treated recovered water can also be treated by heating for removal of alcohols and low molecular weight hydrocarbons if required. FIG. 5 shows a process flow suitable for meeting the EPA Freshwater Standards. In some embodiments, such a process path would allow removal of a bio-decontamination/pasteurization step in the overall process.

In some embodiments, ordering of process steps can be changed to facilitate variability in oil and gas received produced water. Where produced water contains heavy metals that are deleterious to bio-digestion of organic compounds, the heavy metals may be removed by first separation of oil/water and solids and then separation of metals by controlled oxidation using aeration. Ion capture separation inclusive of electrodialysis or ion exchange resins prior to anaerobic bio-digestion could also be utilized. Moreover, while many examples in this document refer to systems and methods for water treatment, it is understood that those

TABLE 3

| Parameter | Post Filtration: Size and Ion Capture and Essentially Microbial Free | Percent Change from Table 1 Data | Post RO | National Recommended Water Quality Criteria (Freshwater) |
| --- | --- | --- | --- | --- |
| Bromide (mg/L) | 9.07 | — | Below Detection Limits | — |
| Calcium (mg/L) | 141 | 63.6 | 0.349 | — |
| Magnesium (mg/L) | 28.2 | 71.3 | Below Detection Limits | — |
| Potassium (mg/L) | 24.6 | 72.0 | 0.541 | — |
| Sodium (mg/L) | 959 | 84.8 | 14.4 | — |
| Chloride (mg/L) | 1820 | 82.8 | 16.2 | 230 |
| Sulfate (mg/L) | 93.2 | 83.7 | Below Detection Limits | — |
| Nitrate as N (mg/L) | 1.81 | — | 0.174 | — |
| Nitrite as N (mg/L) | 0.687 | — | Below Detection Limits | — |
| Total Dissolved Solids (mg/L) | 3620 | — | 39.5 | — |
| Total Petroleum Hydrocarbons | Below Detection Limits | — | Below Detection Limits | — |
| pH | 7.94 | — | 7.21 | 6.5-9 |
| Alkalinity, Carbonate (CaCO$_3$) (mg/L) | Below Detection Limits | — | Below Detection Limits | 200 | systems and methods are described in an exemplary manner only and that other systems and methods may be used. For example, any feature in one embodiment may be included in any other embodiment. Additionally, other treatment steps and devices may be used, depending on the particular needs. Although the foregoing specific details describe certain embodiments, persons of ordinary skill in the art will recognize that various changes may be made in the details of these embodiments without departing from the spirit and scope of this invention as defined in the appended claims and considering the doctrine of equivalents. Therefore, it should be understood that this invention is not limited to the specific details shown and described herein.

The present disclosure is directed to systems and methods for collection, treatment, and recycling of fluids containing water, such as oilfield drilling fluids (also known as drilling mud), produced water, and frac flow back water. Although a primary embodiment described herein may involve oilfield drilling fluids, persons of ordinary skill in the art will understand that systems and methods as described herein, or portions thereof, may also be used to process other wastewater, such as sewage or wastewater from other industrial processes, for example. Therefore, the invention is not limited to the particular embodiments described herein.

Figure 6:
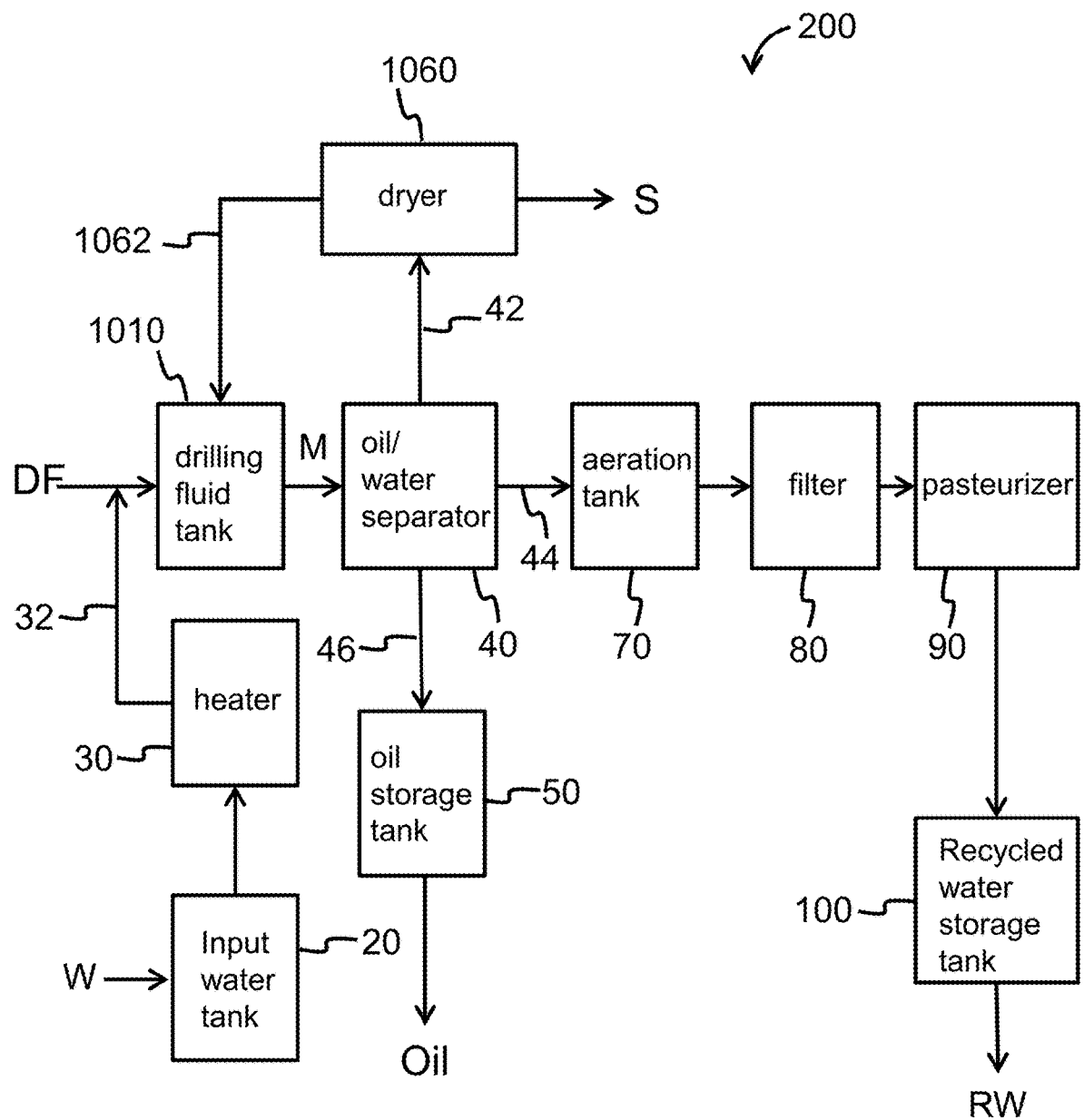
FIG. 6 is a schematic diagram illustrating a method and apparatus for collecting, treating, and recycling oilfield drilling fluids, produced water, and frac flow back water.

As shown in the attached FIG. 6, a system 200 may have a drilling fluid tank 1010 configured for receiving oilfield drilling fluids DF and a water tank 20 configured for receiving produced water and/or frac flow back water (collectively indicated as W, or input water) from oilfield drilling operations, for example. Drilling fluids DF and input water W may be delivered to system 200 by any suitable method, such as tanker trucks or pipelines, for example. In some embodiments, the input water W, which may be naturally acidic, neutral, or basic in terms of pH, may be passed from water tank 20 to a heater 30 in which it is heated to a suitable temperature, such as about 135° F., or about 110° F. to about 150° F., for example, and then blended with the drilling fluids DF for dilution as shown at 32. Such heating may help facilitate better blending of the input water W and drilling fluids DF and may help facilitate separation of water, oil, and solids as described further below. Alternatively, some embodiments may not include a heater 30. For example, in some embodiments, the input water W may include microorganisms and organic matter (either naturally or by addition), and sufficient heat may be generated by the microorganisms decomposing the organic matter during the process as described herein.

Still referring to FIG. 6, the blended mixture M of drilling fluids DF and input water W may be pumped from drilling fluid tank 1010 into an oil/water separator 40, which is described further below. In some embodiments, drilling fluid tank 1010 may have a sloped bottom that directs the blended mixture M toward a pump that feeds the blended mixture M to oil/water separator 40. In oil/water separator 40, the blended mixture M may be separated into oil, sludge, and water components. The oil may be skimmed from the top of the oil/water separator 40 and passed to an oil storage tank 50 as shown at 46 until such time as the oil may be sent to a further destination, such as a refinery, for example. The sludge may be removed from the bottom of the oil/water separator 40 and passed to a dryer 1060 as shown at 42. In dryer 1060, the remaining water in the sludge may be removed and passed back to drilling fluid tank 1010 as shown at 1062, and the dried solids S from the sludge may be output from dryer 1060 and kept for any suitable use, such as road base material or fill, for example. The water (sometimes referred to herein as recovered water) may be passed from oil/water separator 40 to an aeration tank 70 as shown at 44 and described further below. In aeration tank 70, the water is aerated by any suitable means, such as diffused air introduced by one or more blowers through one or more diffusers, or aspirated air drawn into the water by a vacuum, for example. In some embodiments, aspirated air may be preferable due to reduced turbulence, which may better allow thermophilic microorganisms to propagate in the water and enhance the speed at which they decompose the organic materials that may be present in the water thereby generating more heat, which may enhance separation. From aeration tank 70, the water may be passed through a filter 80, which may remove some or all of the remaining particulates from the water. For example, a 10-20 micron filter or other suitable filter may be used. The filtered water may then be passed to a pasteurizer 90 for pasteurization. Alternatively, the water may be passed through pasteurizer 90 before being passed through filter 80. In any event, the process described above may yield filtered, pasteurized, recycled water RW, which may be stored in a storage tank 100 until such time as it may be needed for further use. For example, in some embodiments, recycled water RW may be reused for oilfield drilling or fracking operations or other industrial processes. In some embodiments, pasteurizer 90 may involve heating the fluids to a temperature that exceeds 165° F. for one or two minutes, for example, prior to cooling. This may allow about 99.9% kill on bacteria and viruses. The fluids may then be cooled prior to discharge through the use of heat exchange units where the fluids flow to the filtration process of filter 80.

In some embodiments, a truck washing station may be provided as part of the system described herein, which may allow for much greater efficiency of oilfield operations. For example, a tanker truck carrying a load of drilling fluids DF, or produced water or frac flowback input water W, may unload its drilling fluids DF or input water W into drilling fluid tank 1010 or water tank 20, as the case may be. The tanker truck may then proceed to a washing station at which the recycled water RW may be used to wash out the tank of the tanker truck. The dirty water resulting from the tank cleaning process may be fed into drilling fluid tank 1010, either directly or via water tank 20, for re-processing as part of blended mixture M as described above in connection with FIG. 6. After the tank of the tanker truck is cleaned, it may be reloaded with a fresh load of recycled water RW, which may be transported to an oilfield site for further use in drilling or fracking operations, for example.

Figure 7:
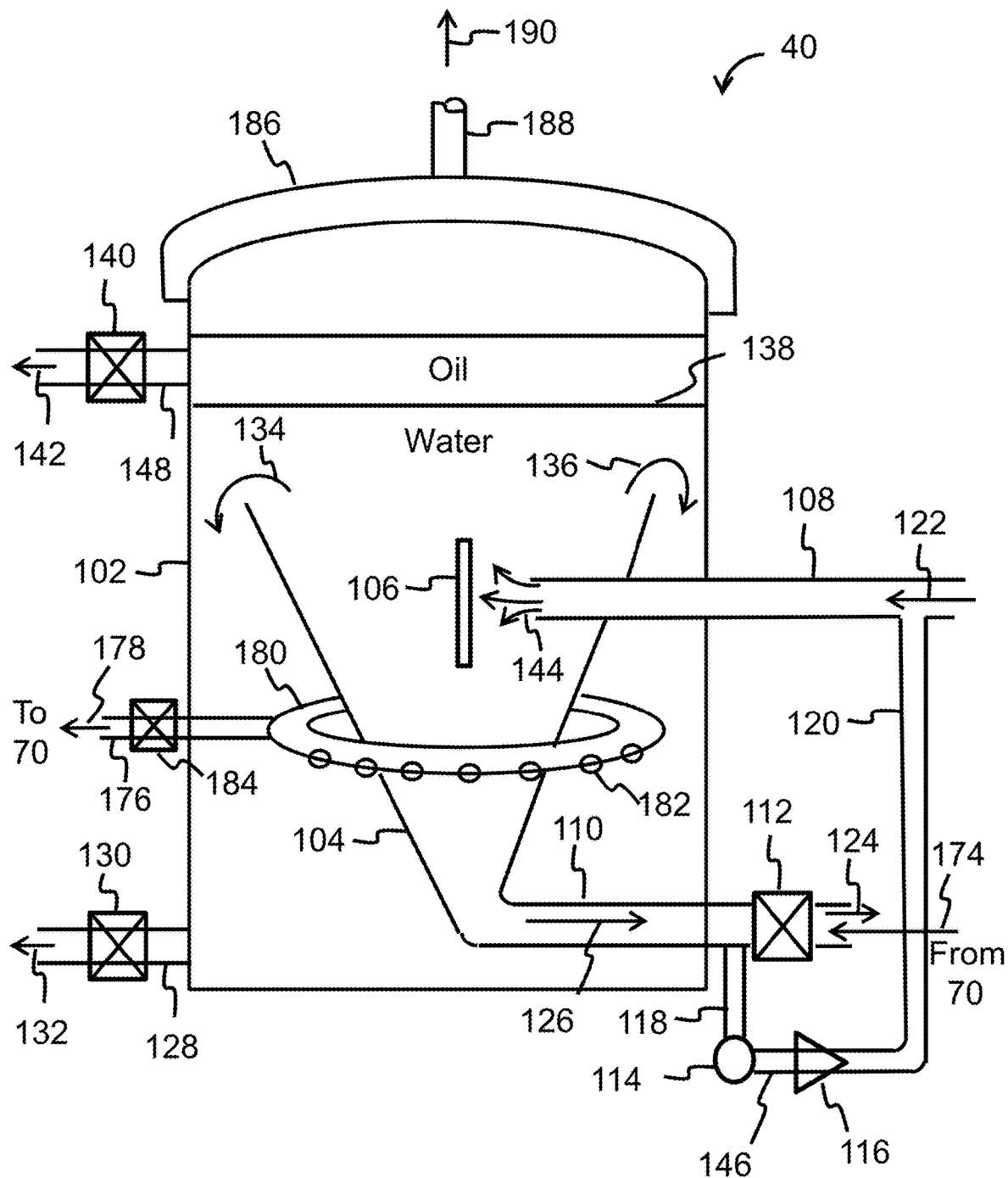
FIG. 7 is a schematic side elevational view of an oil/water separator.
Figure 9:
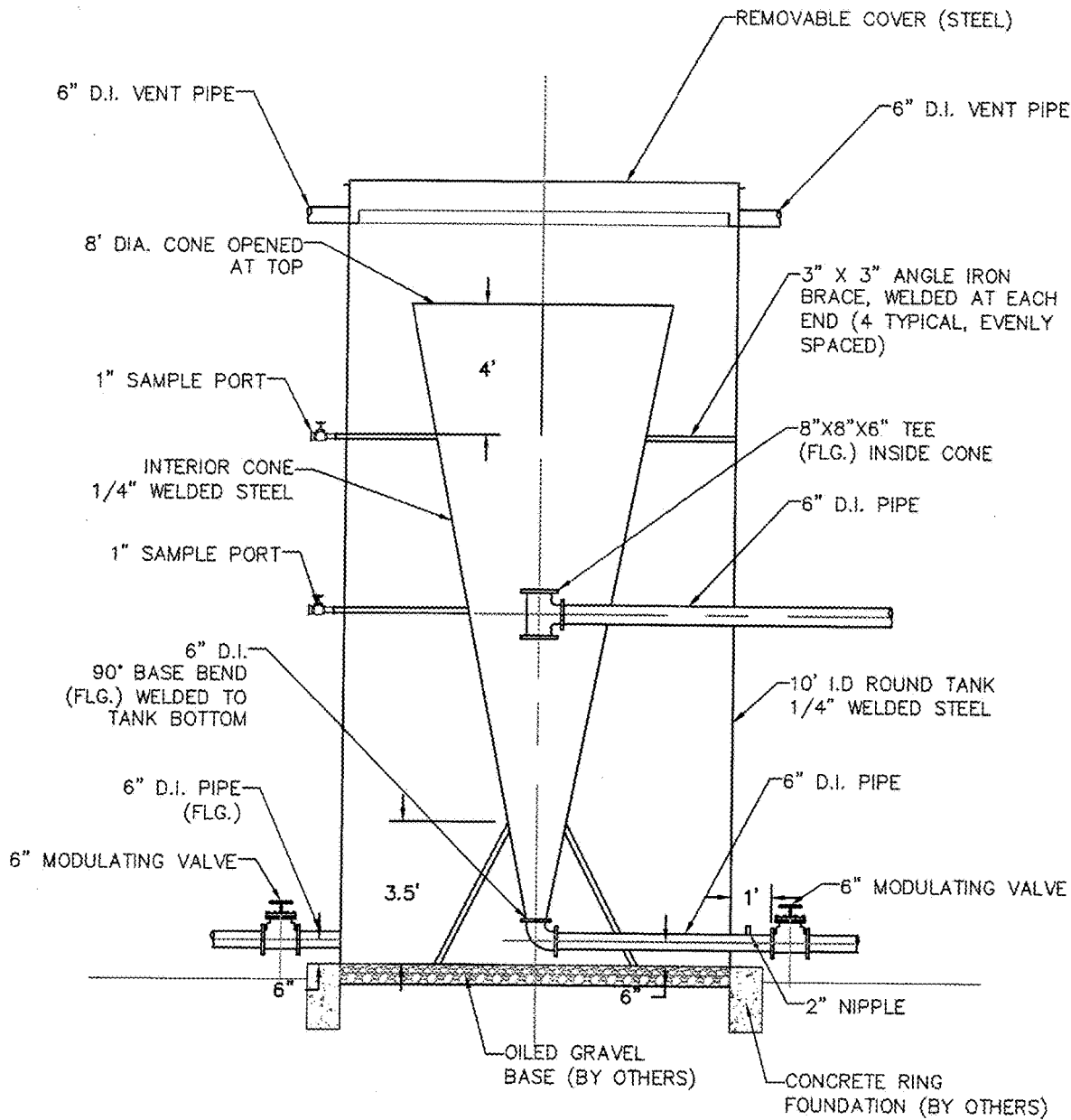
FIG. 9 is a schematic side elevational view of an exemplary embodiment of an oil/water separator.

As shown in FIG. 7, oil/water separator 40 may have a tank 102 with an interior funnel 104 disposed therein. Funnel 104 may be substantially conical or of any suitable shape for directing sludge down toward sludge conduit 110 under the influence of gravity as described further below. An inlet conduit 108 may be configured for injecting the blended mixture M into oil/water separator 40 as shown at 122 and described above in connection with FIG. 6. As the blended mixture M enters the interior space of funnel 104 as shown at 144, a baffle 106 may cause the blended mixture M to begin to separate into oil, water, and sludge components. Due to gravity, the sludge components will tend to fall downward toward the bottom of funnel 104 and be passed into sludge conduit 110. The oil will tend to rise to the top of tank 102, and the water will be allowed to flow over the top rim of funnel 104 as shown at 134, 136 into the annular space between tank 102 and funnel 104. When the flow of blended mixture M through oil/water separator 40 reaches a steady state condition, little to no turbulence may be present in the vicinity of the oil/water boundary 138 (e.g., the fluids may be substantially still at that point), which helps keep the oil separated from the water. This design may also help reduce the likelihood of a "short circuit" of water flow within the oil/water separator 40 (from entry to exit), such that substantially all portions of the incoming blended mixture M realize substantially the same residence time within oil/water separator 40. In some embodiments, oil/water separator 40 may process about 150 to 200 gallons/minute of incoming blended mixture M. Of course, oil/water separator 40 may be sized to achieve any desired flow rate. This design may also reduce the amount of maintenance required and may substantially prevent the formation of $H_2S$ gas in the oil/water separator 40 because of the microorganism activity. The oil may be taken out of tank 102 through an oil exit conduit 148 as shown at 142. A valve 140 may be provided in oil exit conduit 148 to help regulate the flow of oil. The water may be taken out of tank 102 through a water exit conduit 128 as shown at 132, and a valve 130 may be provided in water exit conduit 128 to help regulate the flow of water. As shown at 126, the sludge may be passed out of tank 102 through sludge conduit 110. A valve 112 may be provided in sludge conduit 110 to help regulate the flow of sludge out of oil/water separator 40 as shown at 124. In some embodiments, a portion of sludge may be diverted from the sludge exit stream via conduit 118 and pump 114 in order to aerate the sludge by means of a venturi or other suitable aerator 116 and return the aerated sludge back to tank 102 via conduit 120, which feeds into inlet conduit 108. The sludge may have a pressure of about 9 psi at the inlet of pump 114, about 50 psi at the outlet of pump 114 (indicated at 146), and about 9 psi at the outlet of aerator 116, for example. Of course, other suitable pressures may be used, depending on the particular application. Such aeration may help facilitate further digestion of organic materials by microorganisms in the blended mixture M due to extended air contact stabilization of decomposing organic matter. Thus, in such embodiments, oil/water separator 40 may serve as a digester as well as a separator. A more detailed example of an oil/water separator is shown in FIG. 9. In some embodiments, such aeration may also help facilitate removal of hydrocarbons from the solids within funnel 104 of oil/water separator 40 by recycling aspirated air to wash the hydrocarbons from the solids contained within funnel 104. Additional treatment value may be realized through the anoxic value of the aspirated air that is introduced to oil/water separator 40. This may allow hydrophilic microbes to convert themselves to thermophilic, which may generate temperature as well as reduction of the time necessary for digestion of the nutrients contained in the fluids.

In light of that digester aspect, separator 40 may also be used to recycle wastewater. In a wastewater treatment embodiment, wastewater may enter separator 40 via inlet conduit 108, and separator 40 may function much like the manner described above for a blended mixture M, except that there may be no oil present. Sludge may be removed from the wastewater and extracted via sludge conduit 110, and water may be extracted via water exit conduit 128. Alternatively, the water may be extracted off the top of separator 40, such as via exit conduit 148. In some embodiments, a V-notch weir may be provided for the extracted water to flow over and into exit conduit 128 or 148. The extracted water may be further treated by aeration, filtration, and pasteurization as described above.

Oil/water separator 40 may be sized and configured for any desirable flow rates and residence times. For example, in some embodiments in which tank 102 has a diameter of about 10.0 ft. and a height of about 24.0 ft., a flow rate of about 200 gallons per minute (gpm) of blended mixture M may be achieved, with a residence time of the fluids in oil/water separator 40 of about 100 minutes. Oil/water separator 40 may be operated at any suitable temperature, such as about 135° F. to about 160° F., or about 140° F., for example. Of course, any suitable sizing, flow rate, and residence time may be utilized, depending on the particular fluid composition, pressure and temperature conditions, and other process variables.

Separator 40 may be used for any application requiring separation of an oil/water mixture. For example, separator 40 may be used to separate oil and water at tank batteries or collection stations at oil wells.

Referring again to FIG. 7, in some embodiments, oil/water separator 40 may have a cover 186 sealed on top of tank 102 in order to capture gases produced in tank 102. In such embodiments, oil/water separator 40 may serve as an anaerobic reactor. Cover 186 may be domed or pitched to help facilitate such gas capture and direct the gases toward a gas outlet 188, which may be regulated with a valve or other suitable gas flow regulator. Such gases may be discharged from tank 102 as shown at 190 and used to help power gas burning equipment included in system 200 (FIG. 6) or system 300 (FIG. 10) as described herein, such as heater 30 or dryer 1060, for example, or other gas burning equipment. Thus, such gases may be put to beneficial use rather than simply being released or flared off to the atmosphere, for example, which makes systems 200, 300 more efficient and environmentally friendly. Additionally, inclusion of cover 186 may allow oil/water separator 40 to be located and operated inside a building, if desired.

As also shown in FIG. 7, in some embodiments, oil/water separator 40 may include one or more water collection tubes 180 disposed about funnel 104 in tank 102. Water collection tubes 180 may have one or more inlets 182 through which water may enter from tank 102. In some embodiments, inlets 182 may be disposed on an underside of a collection tube 180 in order to prevent or limit solids from falling into collection tube 180 as they fall downward in tank 102. Water may be extracted from the one or more collection tubes 180 via one or more conduits 176, which may be regulated by one or more valves 184, and passed to aeration tank 70 as indicated at 178. Such water collection tubes 180 and conduits 176 may be located at any suitable elevation within tank 102, such as approximately midway between the bottom and top, for example, and such an arrangement may help prevent or minimize short-circuiting of the flow of water from the inlets to the outlets of tank 102.

Figure 8:
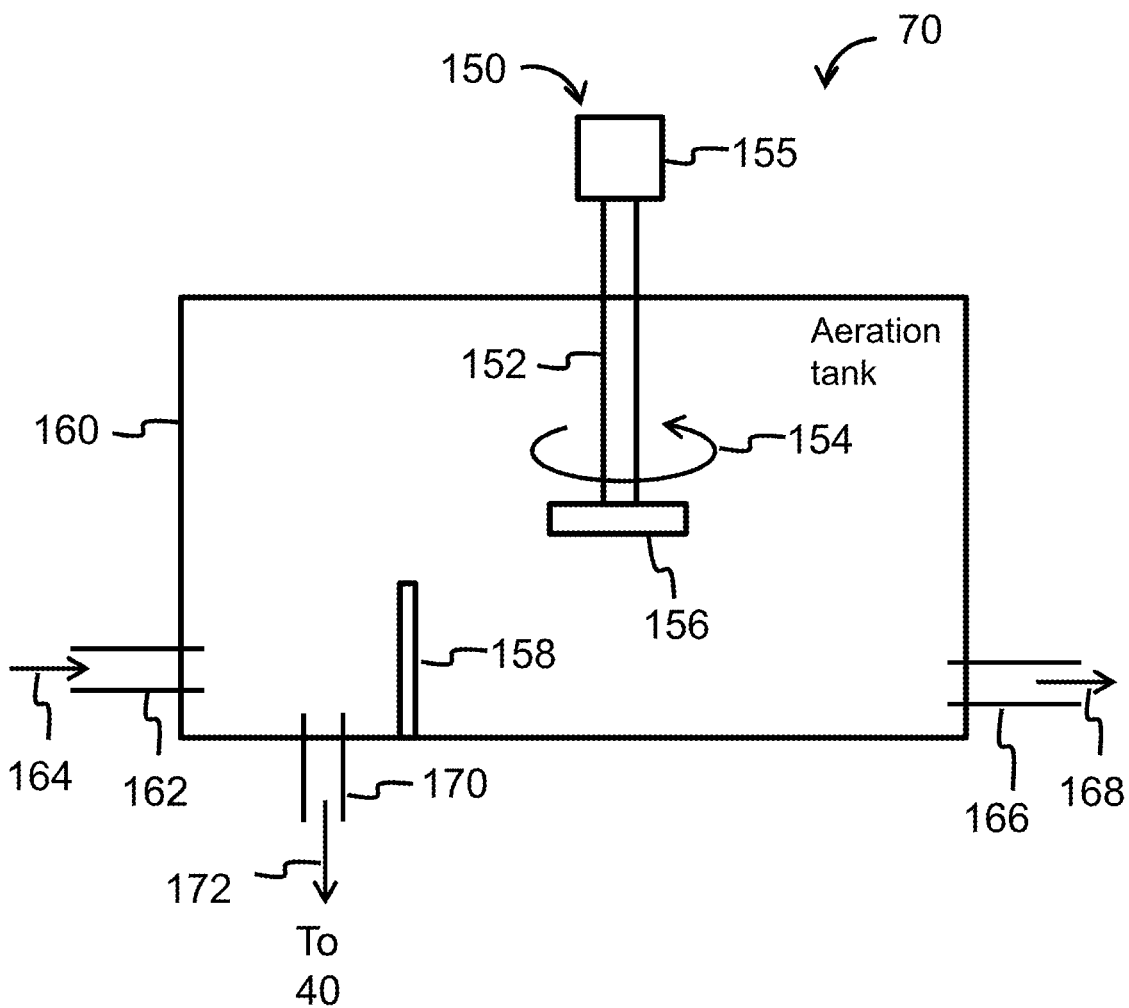
FIG. 8 is a schematic side elevational view of an aeration tank.

As shown in FIG. 8, in some embodiments, aeration tank 70 may include a tank 160 having an inlet 162 and an outlet 166. A baffle 158 may be provided near the inlet 162 to help break up the flow of the incoming water and avoid "short circuiting" the flow from the inlet 162 to the outlet 166. An aerator 150 may be mounted to tank 160. Any suitable aerator may be used. For example, aerator 150 may have a motor 155 that turns a rotating shaft 152 as shown at 154 and dispenses air into the water inside tank 160 via a rotating manifold 156 connected to shaft 152. For example, aerator 150 may be a FracCure™ turbine aerator available from FracCure, LLC (Wimberley, TX). In some embodiments, water may be intermittently or periodically pulled from a bottom region of tank 160 via a conduit 170 and sent to sludge conduit 110 of oil/water separator 40 as shown at 172 (see also arrow 174 in FIG. 7) in a countercurrent manner via a pump in order to clean out sludge conduit 110 and prevent it from being clogged. Such countercurrent anti-clogging water injection into sludge conduit 110 may also help break up and expand the surface area of solids in funnel 104, which may enhance the separation of oil from the solids and help raise the oil/water boundary 138 sufficient to permit the skimming of oil from the top of oil/water separator 40 via oil exit conduit 148.

Referring again to FIG. 6, in some embodiments, system 200 may be used to process a blended mixture M of oilfield drilling fluids DF and input water W as described herein to yield recycled water RW that is substantially bacteria-free clean brine water. Such brine water may be substantially free of hydrocarbons and suspended and dissolved solids (e.g., at least about 95% pure or better in those respects) but may have one or more salts remaining therein (e.g., chlorides, fluorides, sulfates, acetates, and/or other salts). The particular remaining salts and their concentrations in the recycled water RW may be dependent on the composition of the particular oilfield drilling fluids DF and input water W that are put into system 200. Oil/water separator 40 may remove excess minerals, metals, and volatile organics from the mixture M to a first purity level; aeration tank 70 may further remove such minerals, metals, and volatile organics from the recovered water to a second purity level via oxidation and equalization; and filter 80 may further remove such minerals, metals, and volatile organics from the recovered water to a third purity level via filtration. Heater 30 may help facilitate the killing or inactivation of bacteria present in the input water W, and pasteurizer 90 may help facilitate the killing or inactivation of bacteria present in the recovered water. In addition to or in lieu of pasteurizer 90, the recovered water may be passed through one or more other devices that may serve to kill or inactivate bacteria that may be present in the recovered water, such as a UV light source, sanitizer, or heater, for example, such that the resulting brine water RW may be substantially free of active bacteria (e.g., at least about 99% free or up to 100% free of active bacteria). The resulting brine water RW may be heavier (e.g., about 9 to 10 pounds/gallon) than pure water, which is about 8.3 pounds/gallon, and may be "slick" (i.e., having calcium and magnesium content reduced to drinking water levels, wherein metals, minerals, and organic volatiles have been substantially precipitated out). With such heavier weight and "slick" characteristics, the resulting brine water RW may be very useful for fracking and well re-working operations because it may require less amounts of gels and other chemicals that are typically added to water for use in such operations. Thus, such resulting brine water RW may yield significant energy and cost savings in such fracking and re-working operations and may be significantly more environmentally friendly than typical fracking and re-working fluids.

Figure 10:
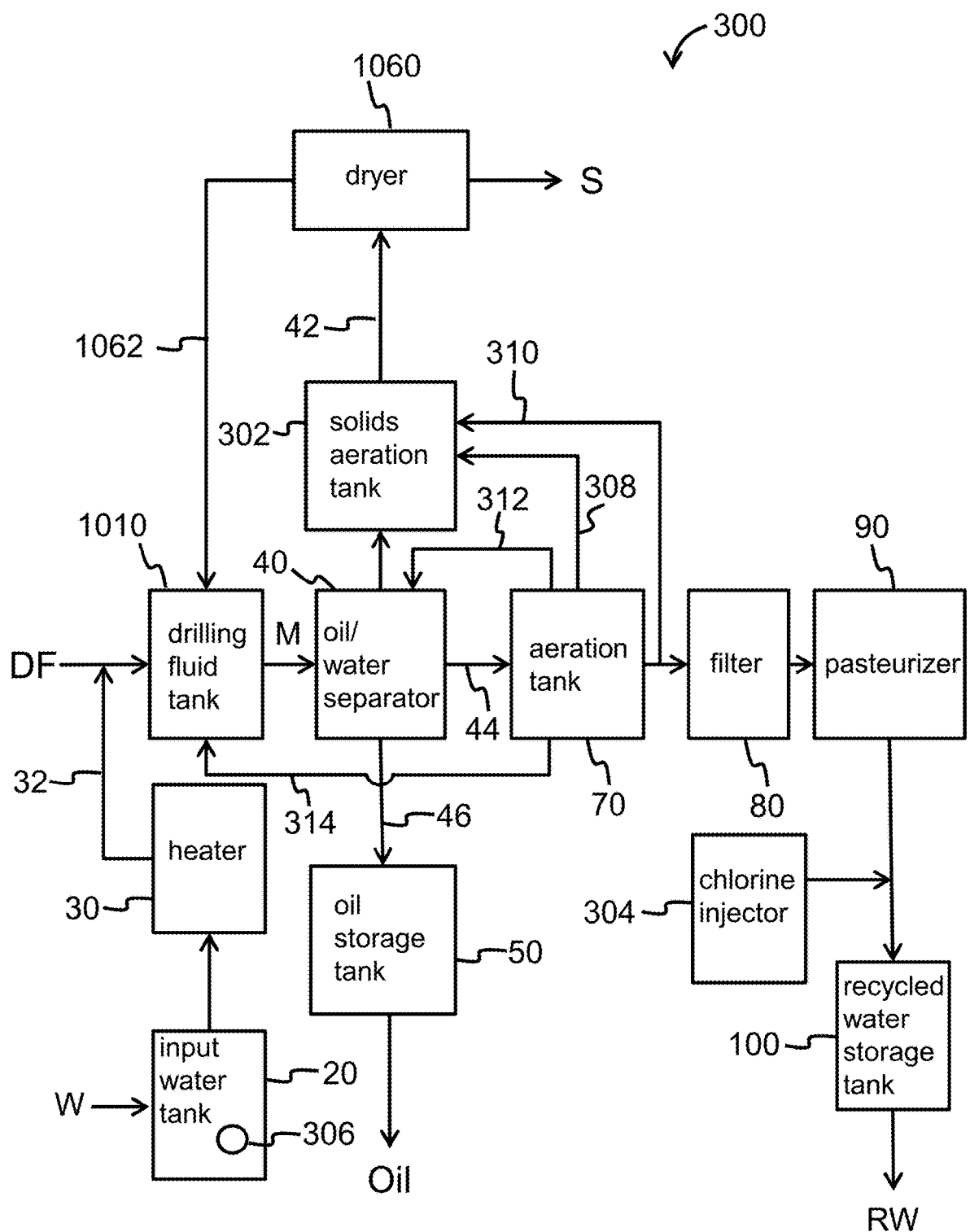
FIG. 10 is a schematic diagram illustrating another method and apparatus for collecting, treating, and recycling oilfield drilling fluids, produced water, and frac flow back water.

Referring to FIG. 10, a system 300 is shown which is similar to system 200 of FIG. 6, except that system 300 also has a solids collection aeration tank 302 and a chlorine injector 304. In some embodiments, system 300 may also have an additional aerator 306 included within input water tank 20 to help condition the input water W prior to being fed into heater 30. In system 300, remaining solids (e.g., sediment) may be extracted from the bottom of aeration tank 70 and passed to solids aeration tank 302 as indicated at 308, and a portion of the water from aeration tank 70 may be fed into solids aeration tank 302 as shown at 310 in order to wash out any remaining hydrocarbons from the solids before they are sent to dryer 1060. In some embodiments, sediment may also be sent from aeration tank 70 to oil/water separator 40 as shown at 312 and/or drilling fluid tank 1010 as shown at 314 for further processing in oil/water separator 40. Such sediment may contain various metals, such as iron, molybdenum, zinc, and the like, for example, which have precipitated out of the input fluids and may help stimulate methane production in oil/water separator 40. Injector 304 may inject free active chlorine, such as Envirolyte™ products available from Envirolyte Industries International Ltd. (Tallinn, Estonia), for example, into the recycled water RW in suitable amounts in order to guard against the proliferation of bacteria therein.

In some embodiments, the water and possibly other supernate fluids may be transferred by gravity from oil/water separator 40 to aeration tank 70 for further treatment as described herein. Intermittent aeration may allow settled solids to be pumped off and recycled to either solids aeration tank 302 for mixing with receiving fluids therein and/or introduction into the solids removal process of the interior of funnel 104 of oil/water separator 40 as described above. From aeration tank 70, the aerated fluids may be transferred by way of a pump to filter 80, pasteurizer 90, and recycled water storage tank 100.

The embodiments described above are some examples of the current invention. Various modifications and changes of the current invention will be apparent to persons of ordinary skill in the art. Among other things, any feature described for one embodiment may be used in any other embodiment. The scope of the invention is defined by the appended claims and other claims that may be drawn to this disclosure, considering the doctrine of equivalents, and is not limited to the specific examples described herein.

What is claimed is:

1. A separator apparatus comprising:
    a tank having an interior wall;
    a funnel disposed in the tank, the funnel including an open top rim spaced apart from the interior wall of the tank;
    an inlet conduit configured for injecting a fluid mixture into an interior portion of the funnel, the fluid mixture comprising wastewater including one or more liquids and one or more solids;
    the funnel configured to permit at least a portion of the one or more liquids to flow over the open top rim of the funnel and downward into a first space bounded by the funnel and the interior wall of the tank;
    a first outlet conduit configured for removing at least some of the one or more liquids from the first space;
    a second outlet conduit configured for removing a separated portion of the one or more liquids from a second space disposed above the funnel; and
    a third outlet conduit configured for receiving at least some of the one or more solids from the funnel and discharging the received solids from the apparatus.

2. The apparatus of claim 1 wherein the fluid mixture includes one or more bacteria useful for digesting organic matter included in the fluid mixture.

3. The apparatus of claim 2 wherein the one or more bacteria includes aerobic bacteria.

4. The apparatus of claim 2 wherein the one or more bacteria includes anaerobic bacteria.

5. The apparatus of claim 2 wherein the one or more bacteria includes aerobic bacteria and anaerobic bacteria.

6. The apparatus of claim 1 wherein the third outlet conduit is further configured to receive aerated water in a countercurrent manner to prevent clogging of the third outlet conduit.

7. The apparatus of claim 1 further comprising an aerator configured for receiving a diverted portion of sludge from the third outlet conduit, aerating the diverted portion of sludge, and returning the aerated portion of sludge to the funnel via a return conduit.

8. The apparatus of claim 1 further comprising a cover sealed to a top portion of the tank, the cover configured to capture gases produced in the tank, and a gas outlet configured for discharging the gases from the tank.

* * * * *